United States Patent
Joul et al.

(10) Patent No.: US 10,554,506 B2
(45) Date of Patent: Feb. 4, 2020

(54) USER-INITIATED QUALITY OF SERVICE MODIFICATION IN A MOBILE DEVICE

(71) Applicant: T-Mobile USA, Inc., Bellevue, WA (US)

(72) Inventors: Christopher H. Joul, Bellevue, WA (US); Gamze Seckin, Mercer Island, WA (US); Pablo Tapia, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/283,886

(22) Filed: Oct. 3, 2016

(65) Prior Publication Data
US 2017/0026253 A1 Jan. 26, 2017

Related U.S. Application Data

(62) Division of application No. 14/259,998, filed on Apr. 23, 2014, now Pat. No. 9,462,579, which is a division
(Continued)

(51) Int. Cl.
| | | |
|---|---|---|
| *H04L 12/24* | (2006.01) | |
| *H04W 48/18* | (2009.01) | |
| *H04L 12/14* | (2006.01) | |
| *H04M 15/00* | (2006.01) | |
| *H04W 24/08* | (2009.01) | |

(Continued)

(52) U.S. Cl.
CPC ...... *H04L 41/5029* (2013.01); *H04L 12/1421* (2013.01); *H04L 41/22* (2013.01); *H04L 41/5064* (2013.01); *H04M 15/8016* (2013.01); *H04W 24/08* (2013.01); *H04W 48/18* (2013.01);
(Continued)

(58) Field of Classification Search
CPC .......... H04L 41/5029; H04L 12/1421; H04W 48/18; H04W 88/02; H04W 88/12
See application file for complete search history.

(56) References Cited

U.S. PATENT DOCUMENTS 7,684,333 B1 * 3/2010 Dasylva ................ H04L 5/0037
370/235.1
8,712,389 B2 4/2014 Joul et al.
(Continued)

FOREIGN PATENT DOCUMENTS

EP 1241911 7/2006

OTHER PUBLICATIONS

International Searching Authority, International Search Report and Written Opinion, PCT Application No. PCT/US2012/066422, dated Mar. 4, 2013, 11 pages.

*Primary Examiner* — Qun Shen
(74) *Attorney, Agent, or Firm* — Perkins Coie LLP

(57) ABSTRACT

A system and method that facilitates mobile device selection among available qualities of service is described herein. A mobile device presents a user interface to enable selection of change to a current quality of service on the mobile device. The user interface further enables selection of one or more parameters associated with the selected change to the current quality of service. In response to the selection, the mobile device transmits to the telecommunications network the selected change in quality of service. The mobile device then receives the selected change in quality of service if the telecommunications network is able to accommodate the selected change.

17 Claims, 9 Drawing Sheets

Related U.S. Application Data of application No. 13/302,949, filed on Nov. 22, 2011, now Pat. No. 8,712,389.

(51) Int. Cl.
*H04W 72/04* (2009.01)
*H04W 88/02* (2009.01)
*H04W 88/12* (2009.01)

(52) U.S. Cl.
CPC ........ *H04W 72/0413* (2013.01); *H04W 88/02* (2013.01); *H04W 88/12* (2013.01)

(56) References Cited

U.S. PATENT DOCUMENTS

| | | | | |
|---|---|---|---|---|
| 8,761,095 B1* | 6/2014 | O'Brien | ................ | H04W 28/24 370/329 |
| 9,462,579 B2 | 10/2016 | Joul et al. | | |
| 2002/0082774 A1 | 6/2002 | Bloebaum | | |
| 2003/0199278 A1* | 10/2003 | Lee | ................ | H04L 1/0006 455/452.2 |
| 2005/0059397 A1 | 3/2005 | Zhao | | |
| 2005/0243863 A1* | 11/2005 | Engelhart | ........... | H04L 12/4641 370/469 |
| 2007/0127375 A1 | 6/2007 | Bae et al. | | |
| 2007/0147388 A1* | 6/2007 | Kim | ...................... | H04L 45/125 370/395.21 |
| 2008/0081593 A1* | 4/2008 | Moon | ................... | H04W 28/24 455/408 |
| 2008/0089237 A1 | 4/2008 | Molen et al. | | |
| 2008/0132269 A1 | 6/2008 | Shen et al. | | |
| 2008/0181211 A1 | 7/2008 | Parolkar et al. | | |
| 2008/0274715 A1* | 11/2008 | Heit | ...................... | H04M 15/00 455/406 |
| 2009/0117851 A1 | 5/2009 | Malaney | | |
| 2009/0131032 A1 | 5/2009 | Lee et al. | | |
| 2009/0215447 A1 | 8/2009 | Catalano et al. | | |
| 2009/0225677 A1* | 9/2009 | Williams | ............ | H04L 41/0681 370/253 |
| 2009/0231997 A1* | 9/2009 | Yang | .................. | H04M 1/72522 370/229 |
| 2011/0065500 A1* | 3/2011 | Gould | ..................... | A63F 13/12 463/29 |
| 2011/0111729 A1 | 5/2011 | Poltorak et al. | | |
| 2011/0134765 A1 | 6/2011 | Rector et al. | | |
| 2012/0020218 A1* | 1/2012 | Li | ......................... | H04L 43/067 370/235 |
| 2012/0195196 A1* | 8/2012 | Ghai | ..................... | H04W 28/24 370/235 |
| 2012/0196566 A1* | 8/2012 | Lee | ....................... | H04M 15/80 455/408 |
| 2013/0065562 A1 | 3/2013 | Singh | | |

\* cited by examiner

USER-INITIATED QUALITY OF SERVICE MODIFICATION IN A MOBILE DEVICE

CROSS-REFERENCES TO RELATED APPLICATIONS

This application is a divisional application of U.S. patent application Ser. No. 14/259,998, filed on Apr. 23, 2014, entitled "USER-INITIATED QUALITY OF SERVICE MODIFICATION IN A MOBILE DEVICE," now U.S. Pat. No. 9,462,579, which is a divisional application of U.S. patent application Ser. No. 13/302,949, filed on Nov. 22, 2011, now U.S. Pat. No. 8,712,389, and entitled "USER-INITIATED QUALITY OF SERVICE MODIFICATION IN A MOBILE DEVICE," both of which are hereby incorporated herein in their entireties by reference.

BACKGROUND

Users of mobile electronic devices (such as mobile phones, personal digital assistants, computer tablets, or the like) routinely encounter situations where it would be desirable to receive a different quality of service (QoS) associated with wireless communications by a mobile device. Changes in the quality of service might affect the mobile device in a number of ways, including rate of data flow, priority of transmitted data, or amount of data that the mobile device is allowed to send or receive. Current mobile device users are assigned a particular quality of service level by their service provider, where the selected quality of service applies to the user's mobile device during a communication session. Changes to the quality of service are typically dictated by the service provider. For example, the service provider may change the quality of service level based on network conditions that are present in the service provider's network. The quality of service level is often changed by the service provider without notifying the user, thereby impacting the user's experience with the mobile device.

The current process of service-provider-initiated changes in quality of service places severe restrictions on current users of mobile electronic devices. For example, if a current mobile device user attempts to download a large file while at a stadium or sporting event, the download may proceed very slowly due to the large number of mobile device users located within a relatively small geographic area. With current systems, the user is unable to request better service in order to accommodate their short-term need for increased bandwidth. As a result, the user is forced to make do with the available service, even if the user would be willing to pay more to receive improved service. In some circumstances, users may even be precluded from using premium services such as video calling, mapping and other location-based services, because of limitations in the available service. Accordingly, consumers are forced by present wireless service offerings to receive a sub-optimal user experience when attempting to use their mobile device during certain situations.

DETAILED DESCRIPTION

Figure 1:
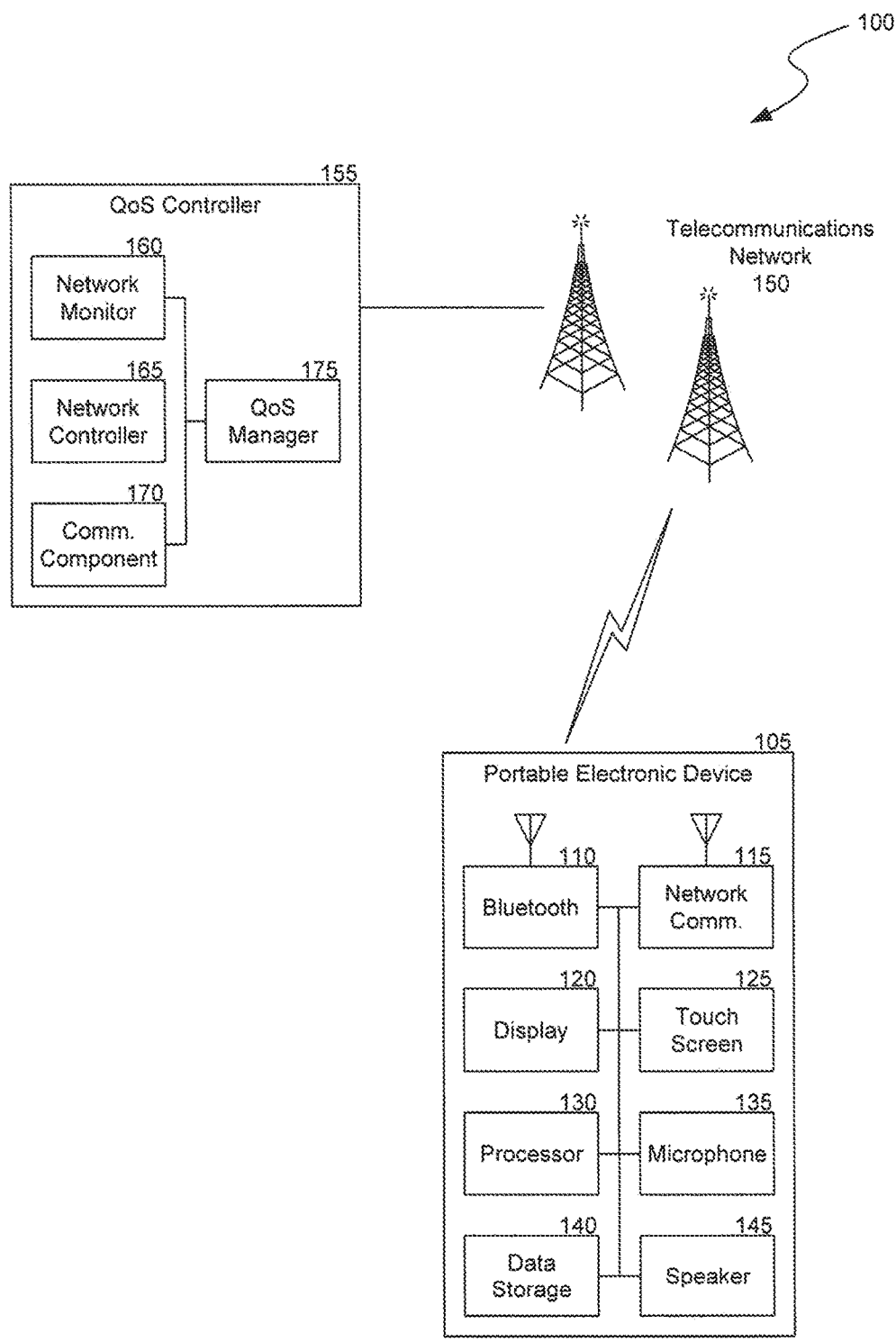
FIG. 1 is a block diagram of components in a mobile device and in a quality of service controller to enable user-initiated changes in quality of service through a telecommunications network.

A system and method for mobile devices that facilitates user-selected changes in quality of service is disclosed. A telecommunications network sends a notification to a mobile device when a change in quality of service is available to the mobile device, or a user of a mobile device may transmit a request to a telecommunications network for a change in quality of service. If a change in quality of service is available, the mobile device displays an indication to the user that a different quality of service is available. The user may then select an upgrade or downgrade to the current quality of service. The mobile device transmits to the telecommunications network the user-selected change in quality of service. In response, the telecommunications network adjusts the quality of service in accordance with the user's request and sends a confirmation to the mobile device. By allowing a user to dynamically change the quality of service at a mobile device, users are able to select a desired service level that best meets their service needs at the time.

In some embodiments, a user is allowed to specify one or more parameters associated with the changed quality of service. For example, the user may specify a period of time (e.g., minutes, hours, for a period coinciding with a voice or a browsing session, etc.) that is associated with the changed quality of service. The mobile device displays an indication of the period of time remaining of the user-selected quality of service. Once the period of time for the changed quality of service elapses, the telecommunication network changes the quality of service to a previous or default level. The mobile device updates the display accordingly to inform the user that the user-selected quality of service period has ended.

As another example, the user may specify a monetary amount that they are willing to pay to receive an improved quality of service. Each increment of time of increased quality of service may be billed to the user at a particular rate. When the monetary amount specified by the user is reached, the telecommunications network changes the quality of service to the previous or default level. The mobile device updates the display accordingly to inform the user that the user-selected quality of service period has ended.

As yet another example, the user may receive incentives to downgrade the quality of service, particularly during peak usage hours when the telecommunications network may be congested. In these situations, the service provider may benefit from one or more users accepting a lower quality of service, thereby freeing network resources and relieving congestion on the network. The service provider may offer incentives to encourage users to accept a lower quality of service. For example, the service provider may offer a user one free upgrade during peak hours for every two downgrades that the user accepts during peak hours. A person of ordinary skill in the art will appreciate that a variety of additional incentives may be offered to encourage the user to accept a downgrade in the quality of service, including one or more monetary credits to the user's account. Either the user may initiate the downgrade in the quality of service, or the service provider may prompt the user to accept a downgrade. A downgrade to the quality of service may or may not be available to the user based on a variety of factors, including whether the service provider determines that network conditions (including congestion levels) warrant either allowing the user to downgrade or offering the user an incentive to downgrade.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 is a block diagram of various components in a mobile device 105 (such as a mobile phone, tablet computer, mobile media device, mobile gaming device, etc.) and a quality of service controller 115 operated by a service provider in association with a telecommunications network. The mobile device 105 includes a data storage medium component 140 (e.g., a hard drive, flash memory, or memory card) that stores content and other data (e.g., processing instructions or configuration settings), and a processor 130 for executing processing instructions in order to implement the various features and functionality disclosed herein. To allow a user to make use of the various services of the mobile device, the mobile device includes a display 120, a keypad, touchpad or touchscreen 125, a microphone 135, and a speaker 145.

The mobile device 105 includes a Bluetooth component 110 or other communication component that implements a short-range communication protocol (e.g., WiFi, Ultra-wideband, ZigBee, infrared, etc.). The mobile device 105 also includes a network communication component 115 that enables the mobile device to communicate by transmitting and receiving wireless signals using licensed, semi-licensed or unlicensed spectrum over a telecommunications network 150. Telecommunications network 150 includes third-party telecommunications networks such as a Global System for Mobile (GSM) mobile telecommunications network, a code/time division multiple access (CDMA/TDMA) mobile telecommunications network, a 3rd or 4th generation (3G/4G) mobile telecommunications network (e.g., General Packet Radio Service (GPRS/EGPRS), Enhanced Data rates for GSM Evolution (EDGE), Universal Mobile Telecommunications System (UMTS), or Long Term Evolution (LTE) network), or other telecommunications network. Those skilled in the art will appreciate that various other components (not shown) may be included in the mobile device to enable network communication. For example, if the mobile device is configured to communicate over a GSM mobile telecommunications network, the mobile device may include a Subscriber Identity Module (SIM) card that stores an International Mobile Subscriber Identity (IMSI) number that is used to identify the mobile device on the GSM mobile telecommunications network. If the mobile device is configured to communicate over another telecommunications network, the mobile device may include other components that enable it to be identified on the other telecommunications networks. In some embodiments, the mobile device 105 includes components that enable it to connect to a telecommunications network using Generic Access Network (GAN) or Unlicensed Mobile Access (UMA) standards and protocols. For example, the mobile device may include components that support Internet Protocol (IP)-based communication over a Wireless Local Area Network (WLAN) and components that enable communication with the telecommunications network over the IP-based WLAN.

The quality of service controller 155 enables the telecommunications network to respond to requests to upgrade or downgrade the quality of service for a mobile device. The quality of service controller 155 includes a quality of service manager 175 coupled to a network monitor 160, a network controller 165, and a communications component 170. The quality of service controller 155 interacts with the mobile device 105 by sending messages and commands through the signaling, control, messaging or other channels of the telecommunications network 150. The network monitor 160 monitors conditions in the telecommunications network 150 to assess traffic, number of mobile devices, types of mobile device, type of mobile device services being utilized, mix of services, and any other network parameter that the service provider may desire to utilize to determine whether network conditions permit allowing mobile devices 105 in a particular cell, region, or location to utilize a higher quality of service or utilize a lower quality of service. The network controller 165 manages telecommunications network settings to allow a quality of service to be modified to one or more mobile devices that access the telecommunication network. The communications component 170 enables control or other messages to be sent to, and received from, mobile devices. The quality of service manager 175 interfaces with the network monitor 160, network controller 165, and communications component 170 to manage requests for quality of service changes. The quality of service manager 175 grants or denies such requests, and controls the timing and duration of changes to the quality of service, as well as costs or credits associated with changes to the quality of service, available to one or more mobile devices.

Figure 2A:
FIG. 2A is a representative user interface on the mobile device with an indication that a user-initiated change in quality of service is not available.

FIG. 2A is a representative user interface 205 presented on a mobile device 200 that contains an indication that a user-initiated change in quality of service is not available. Mobile device 200 includes a display on which the user interface 205 is displayed to a user. While FIG. 2A depicts a touchscreen display, a person of ordinary skill in the art will appreciate that the display may be any of various types of displays, including non-touchscreen displays that present options that may be accessed by selecting one or more physical buttons residing on the mobile device 200 (e.g., buttons 235, 240 and 245). The user interface 205 includes one or more icons operable to allow the user to access features of the mobile device and to navigate various menus associated with the mobile device. A menu icon 210 enables a user to invoke an onscreen menu for navigating various functions of the mobile device. The menu icon 210 may invoke a menu that, for example, presents the user with consistent options related to a phone dialer, address book, quality of service features, etc. Alternatively, menu icon 210 may invoke a context sensitive menu that presents options specifically related to an activity currently being performed by the user on the mobile device. A user may select a back icon 215 and a forward icon 220 to navigate through a series of menu options. A user may select a home icon 225 to take the display to a known or home state.

In some embodiments, the mobile device may display an indication, such as an icon 230, that visually alerts the user to whether changes in quality of service are currently available on the service provider's network. For example, if an upgrade or a downgrade to the current quality of service is available from a service provider, then the mobile device may display an icon (e.g., an icon bearing the initials "QoS") to indicate that a change in the quality of service is available. If, on the other hand, a change to the current quality of service is not available from the service provider, then the mobile device may display a different icon (e.g., the "QoS" icon with a bar extending through the icon) to indicate that a change in the quality of service is not available. In some embodiments, the mobile device may prompt the user to change the quality of service if a change is available. The user could then initiate a change in the quality of service (or decline a change in the quality of service) by selecting the desired option on the mobile device when prompted. A person of ordinary skill in the art will appreciate that a variety of ways may be used for the mobile device to indicate the availability or non-availability of user-initiated changes in quality of service in addition to, or in lieu of, an icon. For example, the mobile device may provide an indication to the user by changing background color, displaying a message in a dialog box, animating or flashing an icon, playing an audio file, or vibrating the device in a particular pattern.

The user interface 205 may be updated at regular intervals to reflect an accurate status of the availability of user-initiated quality of service from the telecommunications network. Such updates may occur at automatic intervals determined by default settings, user-specified settings, or by service provider-specified settings stored on the mobile device or stored on the service provider's network. In addition, the user interface may be updated to reflect the availability of changes to the quality of service on demand as requested by the service provider, by the mobile device, or by the user of the mobile device.

Figure 2B:
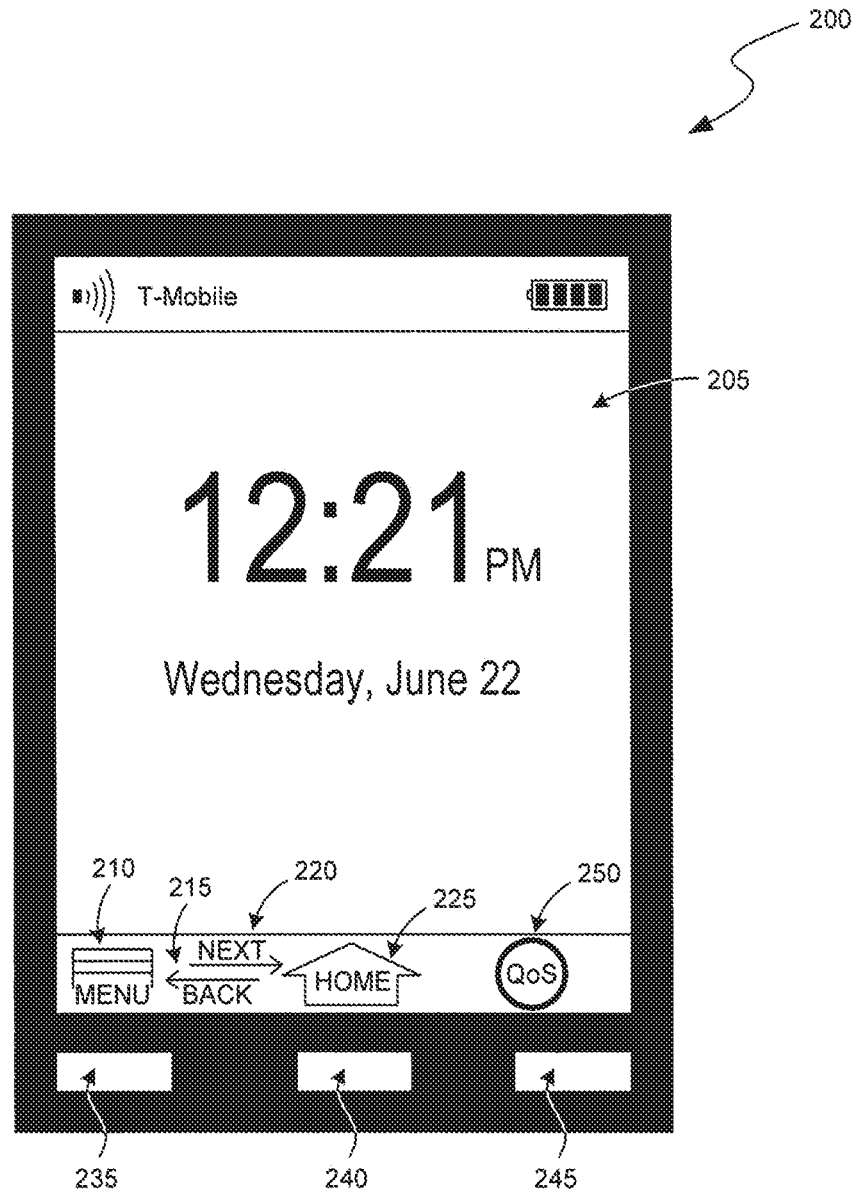
FIG. 2B is a representative user interface on the mobile device with an indication that a user-initiated change in quality of service is available.

As shown in FIG. 2A, icon 230 indicates that a user-initiated change in the quality of service is not available by displaying a diagonal bar through the icon. If a quality of service change is available, the diagonal bar through the icon is removed. FIG. 2B is a representative user interface on the mobile device indicating that a user-initiated change in quality of service is available. Icon 250 displays a quality of service indicator that lacks a horizontal bar, indicating that user-selectable quality of service is available. Accordingly, a user who views icon 230 or 250 is therefore made aware of whether a change to the existing quality of service is available. A person of ordinary skill in the art will appreciate that the appearance and operation of the quality of service indicator (e.g., icon 230 or icon 250) may vary based on a variety of factors, including for example the service plan or subscription type, the data usage quota, the particular mobile device model, and the one or more user applications used on the mobile device.

Figure 3:
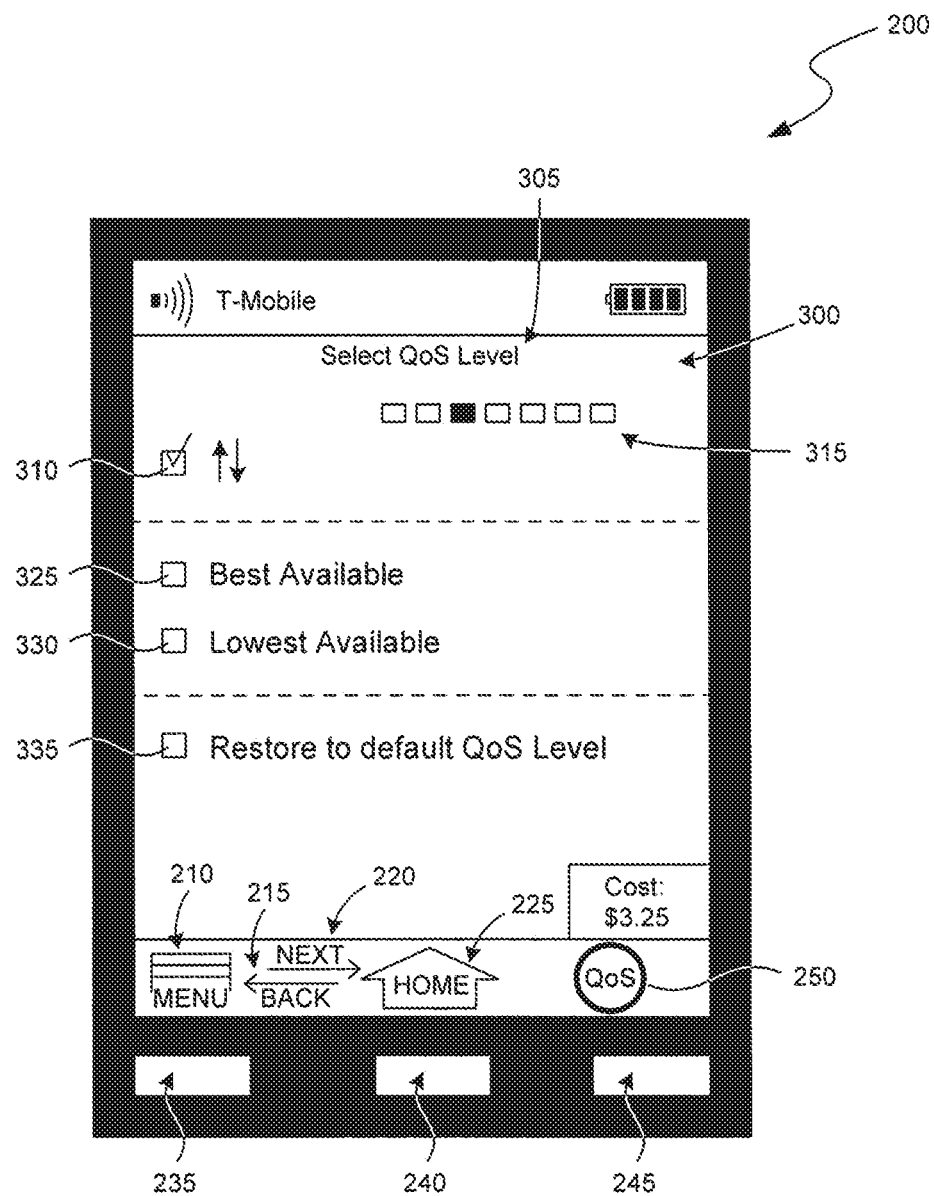
FIG. 3 is a representative user interface on the mobile device allowing a user to select a desired quality of service level.

When a user selects the QoS icon 250 to indicate a desired change in the quality of service, the mobile device may display an interface allowing the user to enter one or more parameters associated with the change in the quality of service. FIG. 3 is a representative user interface 300 presented on the mobile device 200 that allows a user to select a quality of service level. A mobile device user is presented with a menu 305 to upgrade or downgrade the quality of service on the mobile device. The user may invoke menu 305 in a variety of ways, for example by selecting the quality of service icon 250 or by selecting menu icon 210. The user may also invoke the quality of service menu in a variety of additional ways, such as by speaking a command into a speech recognition component of the mobile device, by performing a predetermined gesture on the mobile device, or the menu may be automatically displayed when the user-selected quality of service becomes available.

The menu 305 presents the user with several options for upgrading or downgrading the current quality of service. The menu that is presented will depend on the manner that the service provider implements user-initiated changes in the quality of service. In some embodiments, the service provider may offer different levels of a quality of service. For example, the service provider may offer seven levels of service, with "7" being the highest level of service, "1" being the lowest level of service, and "4" being a default level of service. Service providers may only allow a user to select a better level (i.e., an increase) in the quality of service, or may also allow the user to select a worse level (i.e., a decrease) in the quality of service.

In some embodiments, the service provider may only offer a binary "boost" to the quality of service, meaning that a user can select between having an improved QoS (a "boost") or not having improved QoS (no "boost"). The boost may have different effects for different applications. For example, a voice boost may have one effect (e.g., increased call clarity for a fixed time period) while a video boost may have a different effect (e.g., increased bandwidth for a fixed data period). A person of ordinary skill in the art will appreciate that boosts for various additional applications may have various additional effects. In addition, the service provider may offer one or more boosts as part of the user's service plan, and the service provider may further allow the sharing of boosts across user groups. For example, a user group such as a family or a sporting team may be allocated a fixed number of boosts to be shared among group members as needed. Alternatively, the service provider may analyze the group members and offer one or more boosts to the member or members currently experiencing the lowest quality of service. Furthermore, boosts may be advertising supported. For example, a user may receive one or more boosts (or a reduction in boost fees) for agreeing to receive advertising content.

If the service provider offers different levels of QoS, the user may upgrade or downgrade the quality of service by selecting checkbox 310 and specifying a new level corresponding to the desired quality of service. The available quality of service levels may be depicted graphically, for example by a set of blocks 315. The graphical depiction distinguishes between quality of service levels that represent an upgrade from those representing a downgrade. For example, the user interface may display a text label (such as "lower" or "downgrade") in close proximity to the boxes that represent a lower quality of service than is currently active on the user's mobile device. Similarly, the user interface may display a different text label (such as "higher" or "upgrade") in close proximity to the boxes that represent a higher quality of service than is currently active on the user's mobile device. The user may either increase or decrease the quality of service by further graphical means, for example by selecting up or down arrows 320. The set of blocks 315 indicates the selected quality of service to the user, for example by representing the selected quality of service as a solid box, while representing all other available (but currently unselected) quality of service levels as a hollow or outlined box. As the user selects a new quality of service level via arrows 320, the set of blocks 315 is updated to reflect the user's current selection.

In some embodiments, the user may specify a minimum number of levels to upgrade or downgrade the quality of service in a text-entry field (not shown). For example, the user may enter a value of "2" in the field in order to upgrade the quality of service of the mobile device by at least two levels. The telecommunications network will upgrade the quality of service by at least two levels, if such an upgrade is available, but may also upgrade the quality of service by more than the two levels specified by the user. The same user might instead enter a value of "−1" in the same field in order to downgrade the quality of service by one level.

In some embodiments, the user may quickly upgrade the quality of service to the best available quality of service, or may quickly downgrade the quality of service to the lowest available quality of service. For example, the user may select checkbox 325 to quickly upgrade to the best available quality of service. After receiving such a selection, the telecommunications network will upgrade the quality of service to the highest level currently supported by the network. Additionally, the telecommunications network may monitor the network to perform further upgrades to the quality of service as network conditions allow. Such subsequent upgrades may occur automatically (i.e., without further input from the user or from the user's mobile device) or the subsequent updates may occur after prompting the user to accept or deny the further upgrade.

Similarly, the user may select checkbox 330 to quickly downgrade to the lowest available quality of service. After receiving such a selection, the telecommunications network will downgrade the quality of service to the lowest level currently supported by the network. Additionally, the telecommunications network may monitor the network to perform further downgrades to the quality of service as network conditions allow. Such subsequent downgrades may occur automatically (i.e., without further input from the user or from the user's mobile device) or the subsequent downgrades may occur after prompting the user to accept or deny the further downgrade.

In some embodiments, the user may select checkbox 335 to return to a default quality of service level. The default level may be predetermined by the user, by the manufacturer of the mobile device, by the current conditions in the telecommunications network, or by the service provider. Regardless of the method selected by the user to change the quality of service, the system may automatically enforce the highest or lowest quality of service that is available at a given time, thereby approximating the user's selections as closely as possible. Additionally, in order to attain the user-requested quality of service level, the system may further upgrade or downgrade the quality of service available to the mobile device as the available capacity fluctuates on the service provider's network.

It will be appreciated that as an alternative or in addition to inputting user selections via arrows, the user interface 300 may present other options for inputting user selections of the quality of service level, including sliding bars, rotary dials, or by entering a numerical value or descriptive phrase (e.g., "best available") for the desired quality of service level via a keypad, gesture, or voice command.

In some embodiments, the user interface may display an indication of the price or credit associated with the change to the quality of service. The price or credit may vary depending on multiple factors, including rates set by the service provider, the level of quality of service selected by the user, the presence of one or more credits or charges in the user's account, and/or the time of day, location, or available bandwidth on the service provider's network. As the user selects various options related to quality of service, the associated price or credit is updated and displayed on the user interface, as depicted in item 340 of FIG. 3.

In some embodiments, the various options related to the quality of service are transmitted from the mobile device to quality of service controller 155 through telecommunications network 150. The quality of service controller 155 uses the selected options to determine a price to charge the user or a credit to apply to the user's account, and the quality of service controller 155 then transmits the price or credit information to the mobile device. In some embodiments, the user interface may display an option to confirm that the user accepts the price before the upgrade takes effect. If the user selects a downgrade to the quality of service, the user interface may display an option to confirm that the user accepts the credit from the operator of the telecommunications network before the downgrade takes effect. For example, the user may receive a discount in their next monthly bill if they are willing to accept a certain amount of communications sessions at a reduced quality of service.

Figure 4:
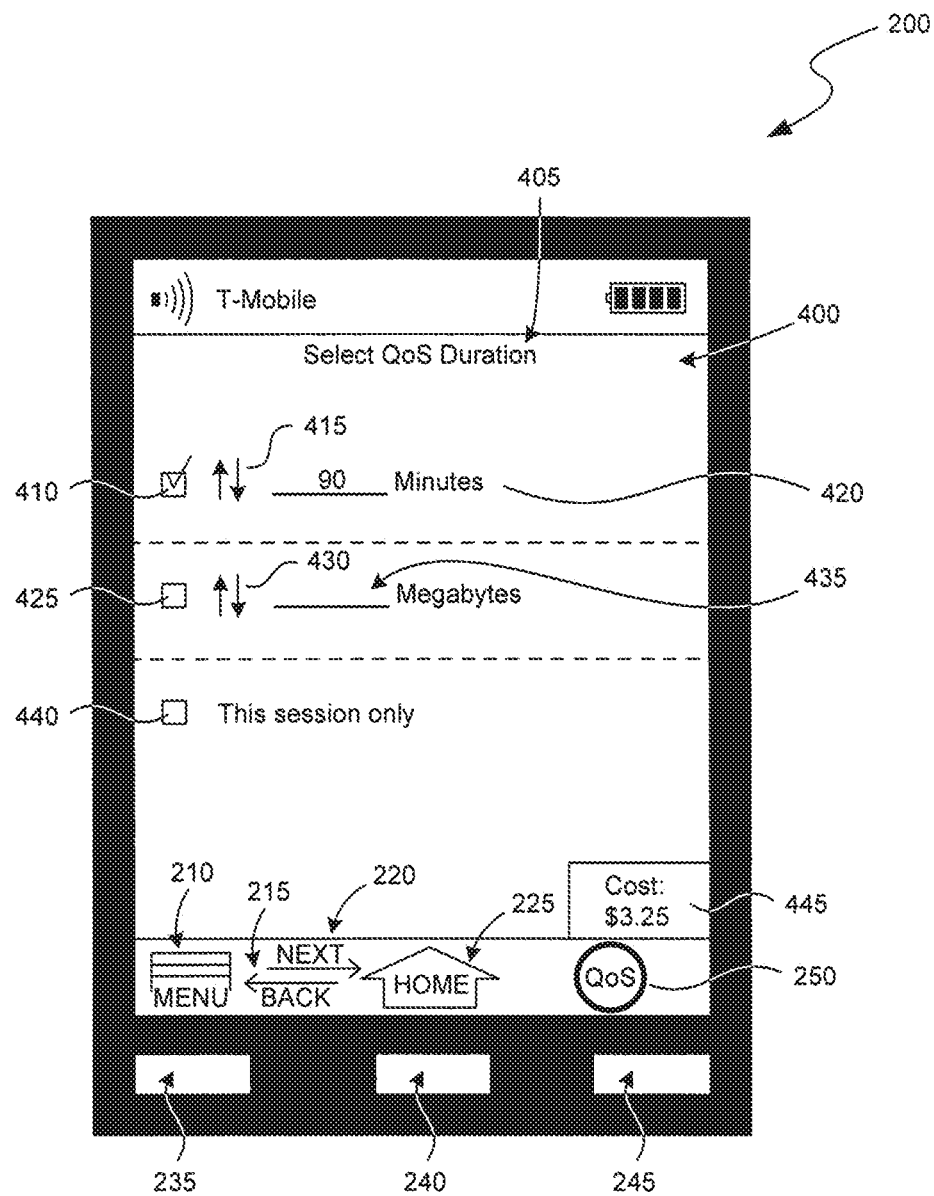
FIG. 4 is a representative user interface on the mobile device allowing a user to specify a duration of a selected quality of service level.

In some embodiments, the mobile device may display an interface allowing the user to specify various parameters associated with the changed quality of service. FIG. 4 is a representative user interface on the mobile device that allows a user to specify parameters associated with a selected quality of service level. A user may encounter multiple situations in which a change to the quality of service level is desired for a limited period. For example, a user may request an upgrade to the quality of service when the user must place or receive an important phone call and the clearest possible reception is required. After the important phone call, the user may not require the clearest possible reception for subsequent phone calls of a casual nature and therefore will desire to terminate the increased quality of service after the important phone call ends. Similarly, the user may plan to download several albums of music or electronic books to a mobile device before a long commercial air flight, and may thus wish to upgrade the quality of service in order to quickly download the desired files. In this instance, the user may select an increase in the quality of service for the limited amount of time necessary to download the music and book files without unnecessarily paying for an increased quality of service that the user may not be able to take advantage of during flight. Similarly, if a user will be in meetings for an extended period of time without access to a mobile device, the user may desire to downgrade the quality of service in order to save money or bandwidth that the user may advantageously use at a different time.

Checkbox 410 allows a user to select a quality of service duration specified as a period of time. The user may use up and down arrows 415 to select a period of time 420 representing the number of minutes that the upgraded or downgraded quality of service will remain in effect. By selecting a first arrow (such as an up arrow), the user increases the time period of changed quality of service, and by selecting a second arrow (such as a down arrow) the user decreases the time period of changed quality of service. For example, the user may select a time period of 90 minutes to receive an upgraded or downgraded quality of service. Once the 90-minute time period elapses, the quality of service returns to a previous or default level, or the user may be prompted to extend the quality of service time period.

In some embodiments, the interface may allow the user to quantify an amount of data that is subject to the changed quality of service. The user may select checkbox 425 and use up and down arrows 430 to specify the quantity of data (e.g., in megabytes 435) that is subject to the changed quality of service. For example, if the user selects a quality of service upgrade for 10 megabytes, the user will receive a higher quality of service while sending and/or receiving the next 10 megabytes of data. After the user sends or receives 10 megabytes of data, the user may be prompted to extend the quality of service period or the quality of service may automatically return to a predetermined level, which may be a default level or a different level determined by the service provider, the user, or the manufacturer of the mobile device.

Checkbox 440 allows the user to upgrade or downgrade the quality of service for the current session only. A session may be defined in various ways. For example, a session may be defined as the amount of time between the present time and the time at which the mobile device is powered down, enters a low power or standby mode, or between when a user starts and ends a particular application session (e.g., a call, a video conference, a browsing session). Alternatively, a session may be defined as the amount of time between the present time and a time at which the mobile device is idle due to a lack of user activity or a lack of network activity. A person of ordinary skill in the art will appreciate that a session may be defined in various additional ways, including, for example, from the present time until the user next invokes a quality of service menu on the mobile device.

In some embodiments, the mobile device may display an interface allowing the user to select one or more applications that may be affected by an upgrade or downgrade to the quality of service. For example, the user interface may allow the user to select one option to upgrade or downgrade the quality of service for all applications on the mobile device. As a further example, the user may choose to upgrade the quality of service for video chat applications and mail applications while allowing voice calls and e-mail applications to remain at a current or default quality of service. Furthermore, the user may choose to simultaneously upgrade the quality of service for one or more applications while downgrading the quality of service for one or more different applications. For example, a user may upgrade the quality of service for video chat applications while simultaneously downgrading the quality of service for e-mail applications. When upgrading or downgrading the quality of service, the user may select one or more applications by type (e.g., all mail applications; all video chat applications) or by application name (e.g., Google Gmail application or Skype application).

In some embodiments, the interface may allow the user to specify an open-ended period during which the quality of service is upgraded or downgraded. If an open-ended period is specified, the selected quality of service will remain in effect until the user specifies a different quality of service applicable to the mobile device.

In some embodiments, the user may be notified of whether the sender can accept a higher quality of service level. For example, if the user intends to initiate a high-definition video chat session with a sender, the user may be notified of whether the sender is capable of establishing a high-definition session or is capable of establishing only a low-definition session. If the sender is capable of establishing a high-definition video chat session, the user may choose to upgrade the quality of service (and pay any associated fees) because the upgrade would result in a video chat session with a higher signal quality. However, if the sender is capable of establishing only a low-definition video chat session, the user may choose to decline an upgrade to the user's quality of service (and avoid any associated fees) because the upgrade would not result in video chat session with a higher signal quality.

As the user enters various parameters associated with the changed quality of service, the user interface may display the price 445, or a credit (not shown), associated with the entered parameters. The mobile device may send the entered parameters to quality of service controller 155 through telecommunications network 150. In response, the mobile device may then receive the price or credit information from quality of service controller 155 for display on the user interface. For example, the user interface may display a price of $3.25 when the user selects an upgrade to the quality of service applicable to all applications for a period of 75 minutes. If the user changes the selected options to instead upgrade the quality of service applicable to only voice calls and e-mail applications for a period of 30 minutes, the user interface may update the display to reflect a lower price of $1.25. Furthermore, if the user changes selected options to downgrade the quality of service for all applications for a period of four days, the user interface may update the display to reflect a user credit of $2.15. In some embodiments, the user interface may display an option to confirm the pricing, the user credit, or the selected options regarding quality of service before the upgrade or downgrade takes effect.

Figure 5:
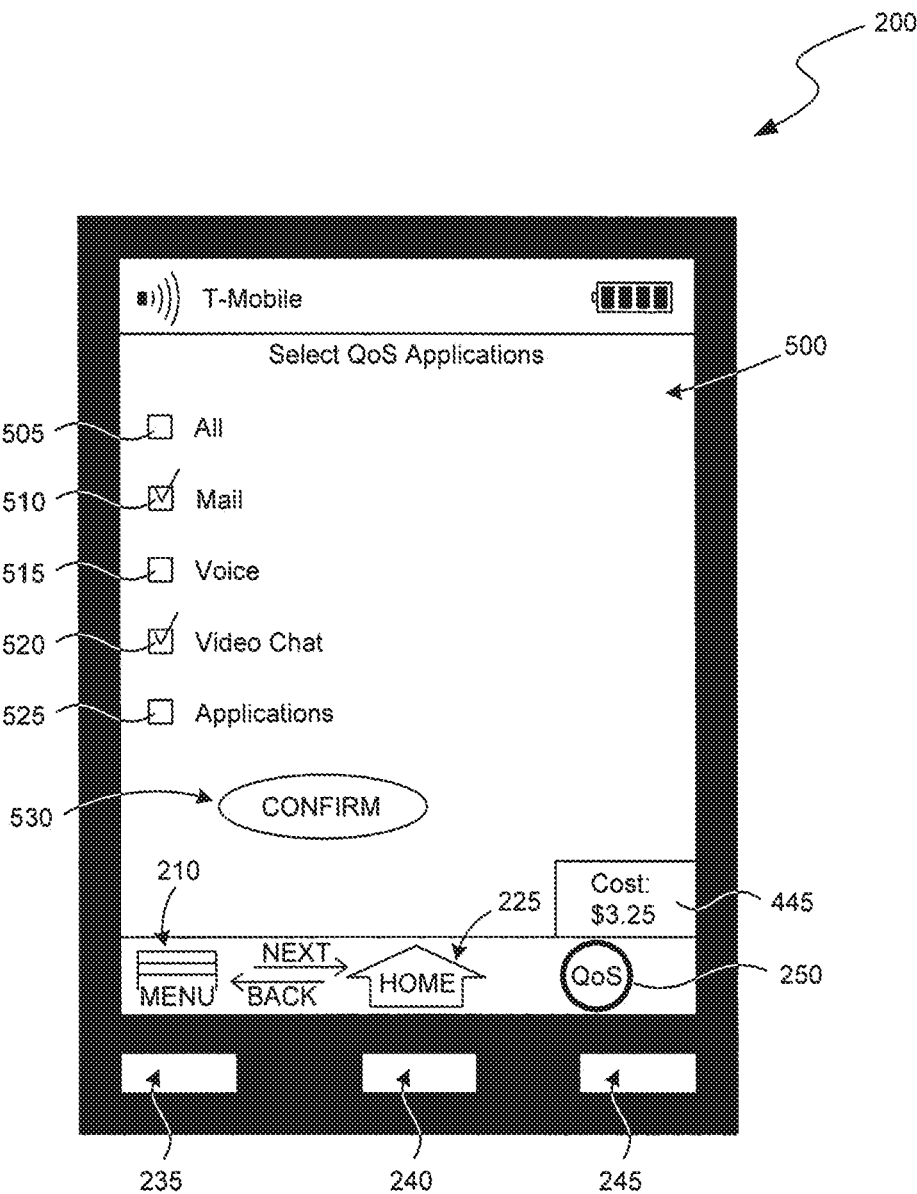
FIG. 5 is a representative user interface on the mobile device allowing a user to specify applications to which a selected quality of service level will apply.

FIG. 5 is a representative user interface 500 on the mobile device that allows a user to specify the applications to which a selected quality of service level will apply. The user may select checkbox 505 to apply the selected quality of service upgrade or downgrade to all available applications on the mobile device, regardless of type or specific application. Alternatively, the user may select checkbox 510 in order to apply the quality of service to mail applications, and the user may additionally select checkbox 520 to apply the quality of service upgrade or downgrade to video chat applications. Similarly, a user may intentionally exclude certain applications from a quality of service upgrade or downgrade. For example, a user may uncheck checkbox 515 to exclude voice services, and the user may uncheck checkbox 525 to exclude applications that have been downloaded and installed on the mobile device.

The user may select and deselect one, all, or multiple services and applications to customize the effect of the quality of service upgrade or downgrade with respect to various services and features of the mobile device. A person of ordinary skill in the art will appreciate that additional customizations may be readily implemented in the described system. For example, a user may customize quality of service to each specific application on the mobile device, to Web browsers, or to mapping or location-based service applications. As a user makes various changes to the desired quality of service, the price of the associated upgrade or downgrade is displayed to the user. Before the requested upgrade or downgrade takes effect, the user may select a confirm icon 530 to verify the parameters associated with the requested quality of service upgrade before the user is billed for the upgrade or downgrade.

Figure 6:
FIG. 6 is a representative user interface on the mobile device with an indication of a period remaining of a selected quality of service.

FIG. 6 depicts the user interface after the quality of service upgrade or downgrade takes effect. After the upgrade or downgrade in quality of service takes effect, the user interface may display in a status indicator 600 an indication of the portion of the quality of service that remains. For example, if the user selects a quality of service time period of 75 minutes, the status indicator 600 may initially indicate that 75 minutes remain in the quality of service time period. One minute later, the status indicator 600 may indicate that 74 minutes remain in the quality of service time period, and so on. Similarly, if the user selects a quality of service data period of 250 megabytes, the status indicator 600 may initially indicate that 250 megabytes remain in the quality of service data period. After the user downloads 56 megabytes of data, the status indicator 600 may indicate that 194 megabytes of data remain in the quality of service data period.

Figure 7:
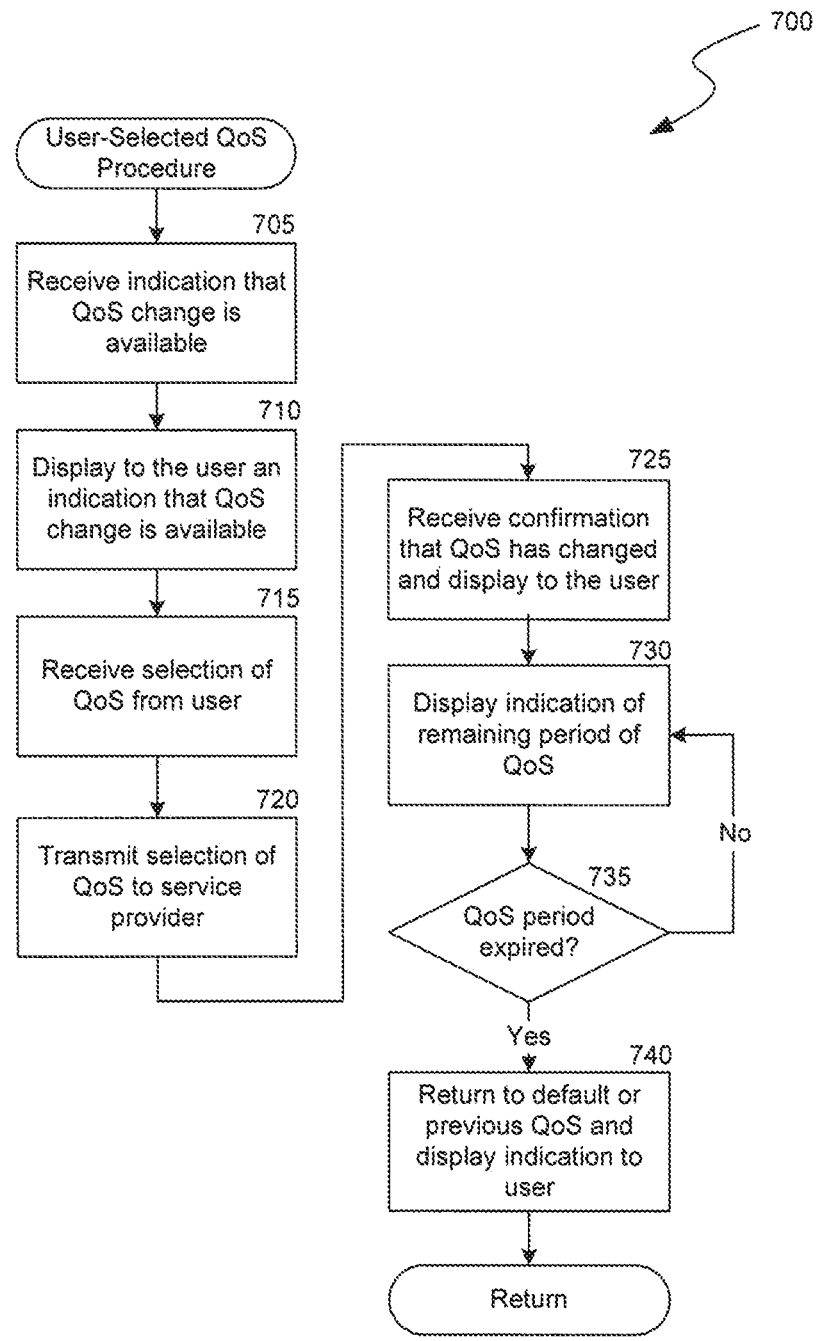
FIG. 7 is a flow chart of a process for initiating from the mobile device a change in quality of service.

FIG. 7 is a flow chart of a process 700 for user-initiated changes in the quality of service from a mobile device. At block 705, the mobile device receives an indication that a user-selected change in the quality of service is available. The telecommunications network may automatically notify the mobile device when the network can support a change in the quality of service of the mobile device. Alternatively, the mobile device may query the telecommunications network automatically or by user request to determine whether an upgrade or downgrade is available to the current quality of service applicable to the mobile device. At block 710, the mobile device displays an indication to the user that a change in the quality of service is available. A person of ordinary skill in the art will appreciate that the indication of an available change in the quality of service may be presented to the user in a variety of ways. For example, in addition to or instead of a visual indication, the mobile device may play a sound or vibrate to indicate to the user that a change in quality of service is available. At block 715, the mobile device receives an indication of a desired upgrade or downgrade to the current quality of service from the user. The user may provide the indication by selecting a menu option via a graphical user interface of the mobile device. A person of ordinary skill in the art will appreciate that the user may provide the indication in a variety of additional ways, such as by speaking into the mobile device or by inputting a gesture on a mobile device touchscreen. At block 720, the mobile device transmits the user's selected quality of service to the service provider. The mobile device may send the user selection to the service provider through any available communication protocol with which the mobile device is compatible. The user may also specify one or more parameters associated with the requested change to the quality of service, such as the length of time, amount of data, application, etc., to which the changed quality of service is to apply.

If the network is able to accommodate the requested change to the quality of service, at block 725 the mobile device receives a confirmation that the quality of service has been changed in response to the user request and displays the confirmation to the user on the mobile device display. A person of ordinary skill in the art will appreciate that the user may receive the confirmation in a variety of additional ways, such as by audible tone or a vibration from the mobile device. At block 730, the mobile device displays an indication of the remaining period of the user-selected quality of service. For example, the mobile device may display a number of remaining minutes or a number of remaining megabytes, depending on the parameters selected by the user or parameters associated with the changed quality of service set by the service provider. At decision block 735, a test is made to determine if the changed quality of service period has expired. If the changed quality of service period has not expired, processing returns to block 730 where the remaining period of the user-selected quality of service is decremented and displayed to the user. If the changed quality of service period has expired, at block 740 the mobile device automatically returns to a default or previously-applied quality of service level and updates the display by removing the indication of the remaining period of quality of service. The process 700 for initiating a change in the quality of service at a mobile device then returns.

Figure 8:
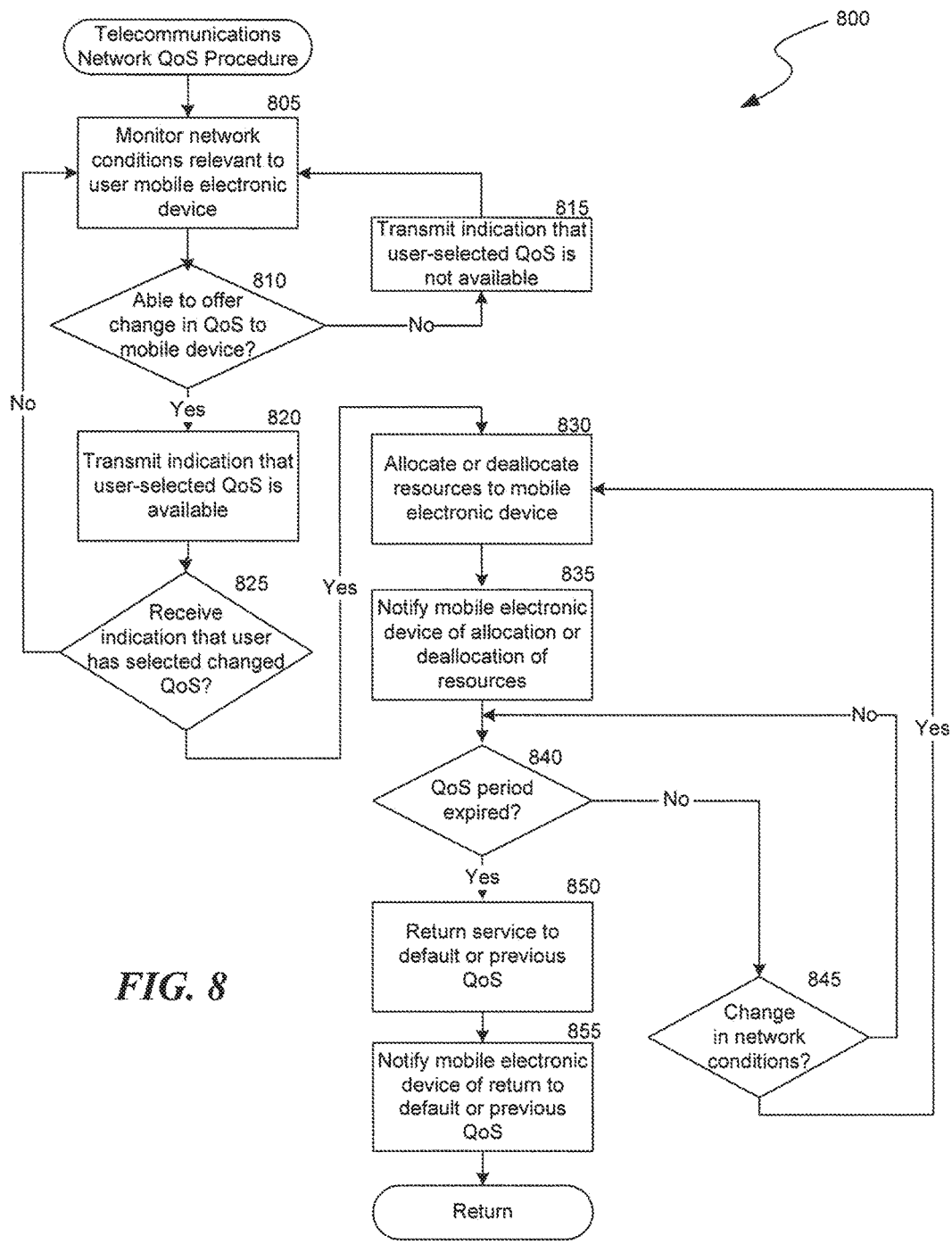
FIG. 8 is a flow chart of a process in a service provider's telecommunications network for receiving and processing a request for a change in quality of service.

FIG. 8 is a flow chart of a process 800 for receiving and processing a request for a change in quality of service from a mobile device. At block 805, the telecommunications network monitors network conditions that are relevant to the service level that can be offered to a user's mobile device. For example, the telecommunications network may monitor overall capacity of a cell in which a mobile device is operating to determine whether excess capacity exists that can be allocated to mobile devices that are operating within the cell. As another example, the telecommunications network may monitor latency issues within certain portions of the network to determine whether latency delays would result in degraded service for high-bandwidth applications, such as video conferencing. At decision block 810, the telecommunications network determines whether the network is capable of supporting a changed level of service to mobile devices operating in one or more cells of the network. If the network is not capable of supporting a changed level of service, the telecommunications network at block 815 transmits to the mobile device an indication that a user-selected change in quality of service is not available. (In some circumstances, a decrease in the quality of service may always be available to a mobile device, but an increase in the quality of service may not be available because of network conditions.) Processing then continues to block 805, where the telecommunications network resumes detecting network conditions that are relevant to the service level that may be offered to a mobile device. If the telecommunications network is capable of offering a changed level of service at decision block 810, then the telecommunications network at block 820 transmits an indication to the mobile device that a user-selected change in quality of service is available. By receiving the indication that a changed quality of service is available, the mobile device is able to offer the user the option to change the quality of service as described in process 700.

At decision block 825, if the telecommunications network does not receive an indication that the user has selected a change to the quality of service, then processing returns to block 805 where the telecommunications network continues to monitor network conditions relevant to the mobile device. If the telecommunications network receives an indication that the user has selected a change to the quality of service at decision block 825, the telecommunications network at block 830 allocates the appropriate resources to the mobile device to enable the requested change. For example, if the user selected a lower quality of service, then the telecommunications network will allocate fewer network resources to the mobile device or will otherwise throttle the service that the user's mobile device receives. If the user selected a higher quality of service, then the telecommunications network will allocate more network resources (e.g., higher bandwidth, increased priority) to the mobile device. In addition to receiving the user's selected quality of service, at block 825 the telecommunications network may also receive one or more parameters that characterize the QoS selection. For example, the user may specify a time period, an amount of data, an application, a session, a monetary amount, or any other parameter that characterizes the requested change to the quality of service. After allocating resources to the mobile device, the telecommunications network at block 835 notifies the mobile device of the change in quality of service.

At decision block 840, the telecommunications network determines whether the user-selected quality of service period has ended. The period may end, for example, when a certain network-selected or user-selected threshold has been reached (e.g., a fixed time period has elapsed, a monetary amount has been reached, a particular communication session has ended, a capped amount of data has been transferred, etc.). If the user-selected quality of service has not ended, at block 845 the telecommunications network determines whether network conditions have changed such that a changed quality of service can no longer be offered to the mobile device. For example, unexpected network congestion may arise that would preclude the telecommunications network from continuing to offer improved quality of service to mobile devices within a particular cell. If network conditions have not changed, the telecommunications network returns to block 840, where it continues to monitor whether the user-selected quality of service period has ended. If network conditions have changed, however, then processing returns to block 830 where the telecommunications network allocates resources to the mobile device in accordance with the changed network conditions. For example, if additional network resources are available (and if the user specified a higher quality of service than was previously available), the telecommunications network increases the resources available to the mobile device. If, however, network conditions have changed such that fewer resources are available, then the telecommunications network may downgrade the quality of service available to the mobile device. In either case, after the telecommunications network changes the quality of service at block 830, the telecommunications network at block 835 notifies the mobile device of the change in quality of service. If at decision block 845 the telecommunications network determines that network conditions have not changed, processing returns to block 840, where the network monitors whether the period of user-selected quality of service has expired.

If the telecommunications network determines that the period of user-selected quality of service has ended, the telecommunications network at block 850 allocates or reallocates resources to returns the mobile device to a default or previous quality of service level. Further, the telecommunications network at block 855 notifies the mobile device that the quality of service has returned to a default level.

Although embodiments including a mobile device and a telecommunications network are described herein, a person of ordinary skill in the art will appreciate that the user-initiated change in quality of service described herein is not limited to mobile devices and telecommunications networks. For example, a person of ordinary skill in the art will appreciate that the user-initiated change in quality of service described herein may extend to a variety of additional network types, including for example cable and satellite television networks.

From the foregoing, it will be appreciated that specific embodiments of the invention have been described herein for purposes of illustration, but that various modifications may be made without deviating from the invention. Those skilled in the art will appreciate that the depicted flow charts may be altered in a variety of ways. For example, the order of the steps may be rearranged, steps may be performed in parallel, steps may be omitted, or other steps may be included. Accordingly, the invention is not limited except as by the appended claims.

We claim:

1. A method in a mobile device, the method comprising:
presenting an interface on the mobile device, wherein:
the interface enables selection among one or more available qualities of service associated with communication services over a wireless telecommunications network accessed by the mobile device; and
the interface enables selection of one or more parameters associated with the one or more available qualities of service, each parameter representing an amount of data that is subject to a selected quality of service or a period of time that reflects the duration of the selected quality of service; and
the interface displays an indication of the remaining time associated with the selected quality of service and a selectable list of applications, wherein the selected quality of service applies to the selected applications;
receiving a selection through the interface of one of the one or more available qualities of service,
wherein the selection includes at least one of the one or more parameters, and
wherein the selected, available quality of service is different from a current quality of service;
transmitting to the wireless telecommunications network the received selection of the one or more available qualities of service; and
receiving the selected quality of service in response to a determination that the telecommunications network is able to accommodate the selected quality of service.

2. The method of claim 1, wherein the interface further enables selection of a parameter representing a monetary amount that is associated with the selected quality of service, wherein the monetary amount comprises a fee to be charged to the user, and wherein the monetary amount is displayed on the mobile device.

3. The method of claim 1, wherein the interface further enables selection of a parameter representing a monetary amount that is associated with the selected quality of service, wherein the monetary amount comprises a credit to be applied to the user's account, and wherein the monetary amount is displayed on the mobile device.

4. The method of claim 1, wherein receiving the selected quality of service further comprises receiving a confirmation that the current quality of service has changed to the selected quality of service.

5. The method of claim 4, wherein the received confirmation is displayed on the mobile device.

6. The method of claim 1, further comprising changing the selected quality of service to a default quality of service or a previous quality of service in response to a determination that the selected quality of service has expired.

7. A non-transitory computer-readable medium storing instructions that, when executed by a processor in a mobile device, causes the mobile device to execute a method, the method comprising: presenting an interface on the mobile device, wherein: the interface enables selection of an available quality of service associated with communication services over a wireless telecommunications network accessed by the mobile device; the interface enables selection of a parameter corresponding to the available quality of service; the parameter represents an amount of data associated with the selected quality of service or a period of time that reflects a duration associated with the selected quality of service;

and the interface displays an indication of the remaining time associated with the selected quality of service and a selectable list of applications, wherein the selected quality of service applies to the selected applications; receiving, through the interface, a selection of the available quality of service, wherein the selection includes a selected parameter, and wherein the selected quality of service is different from a current quality of service; transmitting to the wireless telecommunications network the received selection of the available quality of service; and receiving the selected quality of service in response to a determination that the telecommunications network is capable of accommodating the selected quality of service.

8. The non-transitory computer-readable medium of claim 7, wherein the interface further enables selection of a parameter representing a monetary amount that is associated with the selected quality of service, wherein the monetary amount comprises a fee to be charged to the user, and wherein the monetary amount is displayed on the mobile device.

9. The non-transitory computer-readable medium of claim 7, wherein the interface further enables selection of a parameter representing a monetary amount that is associated with the selected quality of service, wherein the monetary amount comprises a credit to be applied to the user's account, and wherein the monetary amount is displayed on the mobile device.

10. The non-transitory computer-readable medium of claim 7, wherein receiving the selected quality of service further comprises receiving a confirmation that the current quality of service has changed to the selected quality of service.

11. The non-transitory computer-readable medium of claim 10, wherein the received confirmation is displayed on the mobile device.

12. The non-transitory computer-readable medium of claim 7, wherein the method further comprises changing the selected quality of service to a default quality of service or a previous quality of service in response to a determination that the selected quality of service has expired.

13. A mobile device apparatus, comprising: at least one processor; at least memory, coupled to the processor, and storing instructions for performing a method comprising: presenting an interface on the mobile device, wherein: the interface enables selection among one or more available qualities of service associated with communication services over a wireless telecommunications network accessed by the mobile device; the interface enables selection of one or more parameters associated with the one or more available qualities of service, each parameter representing an amount of data that is subject to a selected quality of service or a period of time that reflects the duration of the selected quality of service; and the interface displays an indication of the remaining time associated with the selected quality of service and a selectable list of applications, wherein the selected quality of service applies to the selected applications; receiving a selection through the interface of one of the one or more available qualities of service, wherein the selection includes at least one of the one or more parameters, and wherein the selected, available quality of service is different from a current quality of service; transmitting to the wireless telecommunications network the received selection of the one or more available qualities of service; and receiving the selected quality of service in response to a determination that the telecommunications network is able to accommodate the selected quality of service.

14. The mobile device apparatus of claim 13, wherein the interface further enables selection of a parameter representing a monetary amount that is associated with the selected quality of service, wherein the monetary amount comprises a fee to be charged to the user or a credit to be applied to the user's account, and wherein the monetary amount is displayed on the mobile device.

15. The mobile device apparatus of claim 13, wherein receiving the selected quality of service further comprises receiving a confirmation that the current quality of service has changed to the selected quality of service.

16. The mobile device apparatus of claim 15, wherein the received confirmation is displayed on the mobile device.

17. The mobile device apparatus of claim 13, further comprising changing the selected quality of service to a default quality of service or a previous quality of service in response to a determination that the selected quality of service has expired.

* * * * *